(12) United States Patent
Zambon

(10) Patent No.: US 9,628,497 B2
(45) Date of Patent: Apr. 18, 2017

(54) METHOD AND SYSTEM FOR CLASSIFYING A PROTOCOL MESSAGE IN A DATA COMMUNICATION NETWORK

(75) Inventor: Emmanuele Zambon, Enschede (NL)

(73) Assignee: Security Matters B.V., Enschede (NL)

( * ) Notice: Subject to any disclaimer, the term of this patent is extended or adjusted under 35 U.S.C. 154(b) by 505 days.

(21) Appl. No.: 14/234,669

(22) PCT Filed: Jul. 26, 2012

(86) PCT No.: PCT/NL2012/050537
§ 371 (c)(1),
(2), (4) Date: Jun. 16, 2014

(87) PCT Pub. No.: WO2013/015691
PCT Pub. Date: Jan. 31, 2013

(65) Prior Publication Data
US 2014/0297572 A1    Oct. 2, 2014

Related U.S. Application Data

(60) Provisional application No. 61/511,685, filed on Jul. 26, 2011.

(30) Foreign Application Priority Data

Jul. 26, 2011   (NL) ...................................... 2007180

(51) Int. Cl.
*G06F 15/18*         (2006.01)
*H04L 29/06*         (2006.01)
(Continued)

(52) U.S. Cl.
CPC ............. *H04L 63/14* (2013.01); *G06F 21/50* (2013.01); *G06N 99/005* (2013.01);
(Continued)

(58) Field of Classification Search
USPC ........................................................ 706/12
See application file for complete search history.

(56) References Cited

U.S. PATENT DOCUMENTS 7,757,283 B2 *  7/2010  Robert ................ H04L 12/2602
                                              726/11
7,966,660 B2 *  6/2011  Yermal ............... H04L 63/1416
                                              726/22
(Continued)

FOREIGN PATENT DOCUMENTS

| CN | 101119241 A | 2/2008 |
|---|---|---|
| JP | H9-153924 A | 6/1997 |
| WO | WO 2005/047862 A2 | 5/2005 |

OTHER PUBLICATIONS

Performance evaluation of rough set based classification models to intrusion detection system Priyanka Suyal; Janmejay Pant; Akhilesh Dwivedi; Manoj Chandra Lohani 2016 2nd International Conference on Advances in Computing, Communication, & Automation (ICACCA) (Fall) Year: 2016 pp. 1-6, DOI: 10.1109/ICACCAF. 2016.7748991 IEEE.*

(Continued)

*Primary Examiner* — Michael B Holmes

(57) ABSTRACT

An intrusion detection method for detecting an intrusion in data traffic on a data communication network parses the data traffic to extract at least one protocol field of a protocol message of the data traffic, and associates the extracted protocol field with a model for that protocol field. The model is selected from a set of models. An assessment is made to determine if a contents of the extracted protocol field is in a safe region as defined by the model, and an intrusion detection signal is generated in case it is established that the contents of the extracted protocol field is outside the safe region. The set of models may comprise a corresponding model for each protocol field of a set of protocol fields.

32 Claims, 4 Drawing Sheets

(51) Int. Cl.
  G06F 21/50    (2013.01)
  G06N 99/00    (2010.01)
(52) U.S. Cl.
  CPC ...... H04L 63/0245 (2013.01); H04L 63/1416 (2013.01); H04L 63/1425 (2013.01)

(56) References Cited

U.S. PATENT DOCUMENTS

| | | | | |
|---|---|---|---|---|
| 8,205,259 | B2* | 6/2012 | Stute | C12Q 1/6804 726/23 |
| 8,261,346 | B2* | 9/2012 | Riordan | H04L 63/1491 705/52 |
| 8,839,430 | B2* | 9/2014 | Maatta | H04L 43/062 726/23 |
| 2007/0239999 | A1 | 10/2007 | Honig et al. | |
| 2010/0153785 | A1 | 6/2010 | Keromytis et al. | |
| 2011/0167493 | A1 | 7/2011 | Song et al. | |
| 2014/0090054 | A1* | 3/2014 | Bolzoni | H04L 63/0245 726/22 |
| 2014/0297572 | A1* | 10/2014 | Zambon | H04L 63/0245 706/12 |

OTHER PUBLICATIONS

On efficiency enhancement of the correlation-based feature selection for intrusion detection systems Mahsa Bataghva Shahbaz; Xianbin Wang; Aydin Behnad; Jagath Samarabandu 2016 IEEE 7th Annual Information Technology, Electronics and Mobile Communication Conference (IEMCON) Year: 2016 pp. 1-7, DOI: 10.1109/IEMCON.2016.7746286.*

A hands-off approach to network intrusion detection Yuning Ling; Marcus Rosti; Gregory Swanson 2016 IEEE Systems and Information Engineering Design Symposium (SIEDS) Year: 2016 pp. 216-220, DOI: 10.1109/SIEDS.2016.7489302 IEEE Conference Publications.*

Intrusion detection scheme using traffic prediction for wireless industrial networks Min Wei; Keecheon Kim Journal of Communications and Networks Year: 2012, vol. 14, Issue: 3 pp. 310-318, DOI: 10.1109/JCN.2012.6253092 IEEE Journals & Magazines.*

International Search Report for PCT/NL2012/050537, mailed Oct. 2, 2012.

Notification of Transmittal of the International Preliminary Report on Patentability.

Written Opinion for PCT/NL2012/050537.

Third Party Observation for Int'l Patent Appln. No. PCT/NL2012/050537, Submitted Nov. 26, 2013.

Garcia-Teodoro et al., "Anomaly-based network intrusion detection: Techniques, systems and challenges"; Computers & Security, 28, (2009) 18-28.

Fovino et al., "Modbus/DNP3 State-based Intrusion Detection System"; 2010 24th IEEE International Conference on Advanced Information Networking and Applications, 729-736.

Carcano et al., "A Multidimensional Critical State Analysis for Detecting Intrusions in SCADA Systems"; IEEE Transactions on Industrial Informatics, vol. 7, No. 2, May 2011, 179-186.

Office Action for a Counterpart Chinese Application, dated Mar. 3, 2016 (with translation).

Office Action for a Counterpart Japanese Application, dated May 10, 2016 (with translation).

* cited by examiner

METHOD AND SYSTEM FOR CLASSIFYING A PROTOCOL MESSAGE IN A DATA COMMUNICATION NETWORK

CROSS REFERENCE TO RELATED APPLICATIONS

This application is the National Stage of International Application No. PCT/NL2012/050537 filed 26 Jul. 2012, which in turn claims the benefit of Netherlands Application No. 2007180, filed 26 Jul. 2011, and also of U.S. Provisional Patent Application No. 61/511,685, filed 26 Jul. 2011. The entire contents and disclosure of these priority applications is hereby incorporated by reference herein for all purposes.

FIELD OF THE INVENTION

The invention relates to the field of data communication networks, in particular to the field of classifying messages in data communication networks, for example to detect malicious intrusions in such data communication networks.

BACKGROUND ART

In many data communication networks, detection systems are deployed to detect malicious intrusions. Such intrusions comprise data from attackers or infected computers that may affect the working of servers, computers or other equipment.

There are two main types of such intrusion detection systems: signature-based and anomaly-based intrusion detection systems.

A signature-based intrusion detection system (SBS) relies on pattern-matching techniques. The system contains a database of signatures, i.e. sequences of data that are known from attacks of the past. These signatures are matched against the tested data. When a match is found, an alert is raised. The database of signatures needs to be updated by experts after a new attack has been identified.

Differently, an anomaly-based intrusion detection system (ABS) first builds a statistical model describing the normal network traffic during a so-called "learning phase". Then, during a so-called "testing phase" the system analyses data and classifies any traffic or action that significantly deviates from the model, as an attack. The advantage of an anomaly-based system is that it can detect zero-day attacks, i.e. attacks that not yet have been identified as such by experts. To detect most attacks, ABSes need to inspect the network traffic payload. Existing methods are based on n-gram analysis, which is either applied on the (raw) packet payload or to portions of it.

However, in some data communication networks malicious data is very similar to legitimate data. This may be the case in a so called SCADA (Supervisory Control and Data Acquisition) network or other Industrial Control Network. In a SCADA or other Industrial Control network protocol messages are exchanged between computers, servers and other equipment on an application layer of the data communication network. These protocol messages may comprise instructions to control machines. A protocol message with a malicious instruction ("set rotational speed at 100 rpm") may be very similar to a legitimate instruction ("set rotational speed at 10 rpm").

When the malicious data is very similar to legitimate data, the malicious data may be classified as normal or legitimate data by the anomaly-based intrusion detection system, which could endanger the working of computers, servers and other equipment in the network.

SUMMARY OF THE INVENTION

An object of the invention may be to provide an improved intrusion detection system and/or method.

In accordance with an aspect of the invention, there is provided an intrusion detection method for detecting an intrusion in data traffic on a data communication network, the method comprising:
  parsing the data traffic to extract at least one protocol field of a protocol message of the data traffic;
  associating the extracted protocol field with a respective model for that protocol field, the model being selected from a set of models;
  assessing if a contents of the extracted protocol field is in a safe region as defined by the model; and
  generating an intrusion detection signal in case it is established that the contents of the extracted protocol field is outside the safe region.

Parsing the data traffic allows to distinguish individual fields of a protocol (referred to as "protocol fields") in accordance with which data communication over the data network takes place. An association is then made (if successful) between the field ("the protocol field") and a model. Thereto, a set of models is provided. A suitable model for the extracted protocol field is selected, as will be explained in more detail below. The protocol field is then assessed using the model in order to establish if the contents of the protocol field is in a normal, safe, acceptable range or not. In the latter case, a suitable action may be performed. By parsing the protocol message, the data traffic individual protocol fields may be distinguished, and a suitable model for assessment of that particular protocol field, may be selected. Thereby, an adequate assessment can be made, as different protocol fields may be assessed applying different models, for example each protocol field applying a respective model that is tailored to that specific protocol field, for example applying a model that is tailored to the protocol field type and/or contents. The intrusion detection method in accordance with the invention may be a computer implemented intrusion detection method. The parser (i.e. the parsing) may make use of a predefined protocol specification. Also, for example in case the protocol is unknown, the protocol may be learnt by monitoring the data traffic on the network and deriving a protocol specification therefrom.

In the context of this document, the term protocol may be understood as a set of rules that defines a content of some or all of the messages transmitted via the data network. A network protocol may comprise a definition of protocol messages, also known as Protocol Data Units (PDUs). A protocol message (PDU) may in turn comprise one or more fields. There may be many types of field. A field may comprise either another PDU, or an "atomic" data entity (for example a number, a string or a binary opaque object). As will be described in more detail below, the network protocol may be organized as a tree, in which nodes are PDUs and leaves of the tree are atomic data entities (fields). For each field (or each relevant field) a separate model may be provided. As an example, assume a protocol message comprises personal data of a person (comprising for example name, address and personal settings): a protocol message that transmits the personal data, could then comprise the fields "name", "address", and "personal settings". The field "name" could for example in turn comprise the fields "surname", "given name", "login name", etc. The field "address" could for example comprise the fields "home address" and "business address". The fields "home address" may for example comprise "home address street", "home address number", "home address zip code", "home address city", while the "business address" may for example comprise the fields "business address street", "business address number", "business address zip code", "business address city", etc. A separate model may be built for each field. For example a separate, respective model could be provided for each one of the fields. In an embodiment, a same model may be applied for a subset of fields, for example the fields "business address city" and "home address city" may apply a same model.

The term data traffic may be understood so as to comprise any data that is communicated via the network, such as a data steam, data packets, etc. The term data network may be understood so as to comprise any data communication establishment that allows a transmission of (e.g. digital) data. The network may comprise or be connected to a public network such as the Internet, and/or may comprise a private network or virtually private network to which only authorized users or authorized equipment is allowed access. Transmission may take place via a wired connection, a glass fiber connection, a wireless connection and/or any other connection. The term model may be understood so as to comprise a rule or set of rules that apply to a protocol field, in order to assess that protocol field. The model may describe normal, legitimate or non-intrusive protocol messages. It may be understood that the more protocol messages in the learning phase are used, the better the model may describe the normal, legitimate or non-intrusive protocol messages.

The term intrusion may be understood so as to comprise any data which may be undesired, possibly harmful to a computer system that receives the data, possibly harmful to an application running on a computer system connected to the data network, or possibly harmful to an operation of a device, installation, apparatus, etc. connected to the data network.

In an embodiment, the set of models comprises a respective model for each protocol field of a set of protocol fields. Thereby, more accurate results may be obtained as for each protocol field a model specifically tailored to that protocol field may be applied.

In an embodiment, the set of models comprises two models for one protocol field, a specific one of the two models for the one protocol field being chosen based on the value of another field, so as to possibly further increase a precision of the models.

Similarly, time sequence analysis on the protocol field may be performed in an embodiment wherein the set of models comprises at least two models for one protocol field, a first one of the two models being associated with a first time interval in which the data traffic is observed, and a second one of the models being associated with a second time interval in which the data traffic is observed, the second time interval e.g. non overlapping with the first time interval.

In an embodiment, the model for the field being determined in a learning phase, the learning phase comprising:
  parsing the data traffic to extract at least one protocol field of the protocol applied in the data traffic;
  associating the extracted protocol field with the model for that protocol field, the model being selected from the set of models and
  updating the model for the extracted protocol field using a contents of the extracted protocol field.

Thus, the data traffic may be observed in a learning phase, and the contents of the extracted protocol fields may be applied to update the corresponding models with which the protocol fields are associated. If no association can be made between the extracted protocol field and one of the models, a new model may be created for the extracted protocol field and added to the set of models.

Hence, two phases may be discriminated: a learning phase in which a model of protocol messages is built. These protocol messages in the learning phase may be constructed on the basis of the communication protocol or may be retrieved from data traffic in the data communication network.

Since protocol messages may be described by their structure and the values of the protocol fields, the model may relate to the protocol fields in the learning phase and the values thereof. Different protocol fields in the learning phase may have a different data type, i.e. their value may be an number (such as an integer, a floating point number, etc), a string., a Boolean or a binary value. This may be defined by the communication protocol. The model may be built in accordance with the data type of the at least one protocol field.

The determined protocol field and/or the determined value of said protocol field are compared with the model and classified on the basis of the comparison. The protocol message may be classified as an anomaly, i.e. outside the safe region defined by the model (and thus as a possible danger) on the basis of the comparison.

In the learning phase, the protocol messages that are applied to learn the model, may be obtained from data traffic on the network. Alternatively, or in addition thereto, simulation data may be applied. In the learning phase, possibly intrusive protocol messages may be distinguished by statistical methods, i.e. infrequently used protocol messages or protocol messages having an uncommon contents, may be removed before using the protocol messages for learning the model(s). Additionally, or instead thereof, an operator may identify certain protocol messages as intrusive, and such protocol messages may either be removed before the learning, or the models being corrected accordingly.

Alternatives for learning (i.e. training) the model(s), other than in the above described learning phase may be applied. For example, a model may be derived from inspecting the protocol and the application, creating a set of for example to be expected protocol messages, their fields and/or the values of the fields, there from, and building the model, or a set of models there from. Also, a combination of such building model(s) from inspection, with a learning of the model(s) may be applied: for example first learning the model(s) in a learning phase, and then adapting the learned model(s) based on knowledge of a known behaviour and consequential occurrence and/or contents of protocol messages, their fields and/or the values of the fields.

In an embodiment, the intrusion detection signal is further generated when the parsing cannot establish the field as complying to the protocol, so that an action can be performed also in case a field which is incompliant with the protocol (for example a malformed protocol message) is detected.

In an embodiment, the intrusion detection signal is further generated when the extracted field cannot be associated with any of the models of the set of models, so that an action can be performed also in case the extracted field possibly complies with the protocol, but for which no suitable model is provided. Often, only a subset of the possible protocol fields are used, for example in control applications, allowing for example to raise an alert when a protocol field which complies with the protocol but which is normally not applied, has been retrieved.

The method may be applied on a variety of protocol layers. For example, the protocol may be at least one of an application layer protocol, a session layer protocol, a transport layer protocol or even lower levels of a network protocol stack. An application layer of a data communication network may be defined by the Open Systems Interconnection model (OSI model), which was determined by the International Organization for Standardization. In the application layer, software running on computers or servers may communicate to each other by sending protocol messages. The protocol messages may be SCADA or other Industrial Control networks protocol messages, Windows, office automation networks protocol messages, HTTP protocol messages, etc.

The communication between software may follow a certain communication protocol, in which the structure and possible values of (parts of) the protocol messages are defined. The structure of a protocol message may be further described by the protocol fields in the protocol messages. The software may not be able to process protocol messages that are not in accordance with the communication protocol.

In an embodiment, in response to generating the intrusion detection signal, the method further comprises at least one of:
removing the protocol field or a data packet containing the protocol field; and
raising and outputting an intrusion alert message. Any other intrusion detection action may be applied, such as for example isolating the protocol field or a data packet containing the protocol field, etc.

In an embodiment, the model for the protocol field comprises at least one of
a set of acceptable protocol field values, and
a definition of a range of acceptable protocol field values.
In case the protocol field comprises a numerical value, a simple model may be provided thereby that may allow to test the protocol field at a low data processing load.

In an embodiment, the model for the protocol field comprises
a definition of acceptable letters, digits, symbols, and scripts. In case the protocol field comprises a character or string, a simple model may be provided thereby that may allow to test the protocol field at a low data processing load.

In an embodiment, the model for the protocol field comprises a set of predefined intrusion signatures, so that knowledge about known attacks may be taken into account. A combination of a model as described above (comprising e.g. a set of acceptable protocol field values, a definition of a range of acceptable protocol field values, a definition of acceptable letters, digits, symbols, and scripts) with the set of predefined intrusion signatures may be highly effective, as for each specific field a model of its normal contents in combination with one or more specific intrusion signatures for that field, may be applied.

In an embodiment, the protocol comprises primitive protocol fields and composite protocol fields, the composite protocol fields in turn comprising at least one primitive protocol field, wherein a respective model is provided in the set of models for each primitive protocol field. Thus, efficient intrusion detection may be provided as protocol fields that are composite (i.e. protocol fields that themselves comprise protocol fields, such as "address" comprising "street name", "number', "zip code" and city"), may be split up in their elementary (primitive) protocol fields, allowing to apply a suitable model to each of the primitive protocol fields.

Since the model for the at least one protocol field in the learning phase and/or for the value of the at least one protocol field in the learning phase may be built in accordance with the data type of the at least one protocol field in the learning phase, the model may be more accurate in describing normal, legitimate or non-intrusive protocol messages than a model that does not take into account the data type of the protocol fields.

It may be the case that a model optimized for describing a protocol field with a number data type may be less accurate in (or not applicable for) describing a protocol field with a string or binary data type. Likewise, a model optimized for describing a protocol field with a string data type may be less accurate in describing a protocol field with a number or binary data type. Therefore, the accuracy of the model may be improved by taking the data type of the protocol field into account when building the model.

In an embodiment, a plurality of model types are provided,
a model type for the extracted protocol field being selected in the learning phase from the plurality of model types on the basis of a characteristic of the extracted protocol field, and the model for the extracted protocol field being built on the basis of the selected model type.

In order to obtain a model for a specific protocol field, several steps may be performed. As explained above, a plurality of different model types may be applied. Firstly, a certain model type from a set of available model types is to be selected for the specific protocol field. Once the model type has been determined for a certain protocol field, a model may be built for that protocol field. As described elsewhere in this document, the model may be built for example using an analysis of data traffic in a learning phase. The characteristic of the protocol field may be any suitable characteristic of the data in the protocol field itself, its meaning in the context of the protocol, etc. Some examples will be described below. By adopting different model types it is possible to both apply modelling techniques that are specific to the type of different field values and to adapt the safe region of values in a way that is less or more restrictive according to the meaning, role and importance of the protocol field in the protocol or in the context that the protocol is applied to. In general, different model types may apply different types of criteria in order to establish if a particular protocol field value may be intrusive or not. For example, different types of models may apply either a range of values, a numerical distribution of values, a set of values, a set of operators, a set of text values, a set of state descriptions, a set or range of text characters, a set/range of text encodings etc. The term model type may hence be understood as a set of operations allowed on a certain value type, together with the heuristics for defining a safe region for values of a certain type and the criteria to determine if a certain value is within the safe region.

The selection of the model type may be performed at any time: during a learning phase, as well as during intrusion monitoring and detection. During a learning phase, a model type may be selected as part of the process of building the model for a particular protocol field. During detection, should it appear that the model for a particular protocol field does not provide consistent result, a different model type may be chosen.

The selection of the model type may be performed using the data type of the protocol field value(s), and/or the semantic of the parsed protocol field(s). In an embodiment, the characteristic of the protocol field comprises the data type of the protocol field, the method comprising:
- determining the data type of the extracted protocol field, and
- selecting the model type using the determined data type.

The data type of the protocol field values (such as "number", "string", "array", "set", etc.) may for example be extracted from the protocol specifications. Alternatively, the data type of the protocol field values may for example be inferred from observing network traffic. In one embodiment, field values are inferred by means of regular expressions. For example, the regular expression ^[0-9]+$ may be used to identify numeric integer field values. By choosing an appropriate model type to match the data type of the protocol field values, a model that may result in more reliable detection results, may be obtained.

The selection of the model type may further to or instead of being based on the data type of the protocol field value, be based on a semantic of the parsed protocol field. Hence, in an embodiment, the characteristic of the protocol field comprises the semantic of the protocol field, the method comprising:
- determining the semantic of the extracted protocol field, and
- selecting the model type using the determined semantic.

Semantic may be assigned to the parsed protocol field. Assigning the semantic may be performed in a variety of ways: manually during the learning phase, by inferring from observed network data, by extracting the information from a protocol specification, etc. The semantic may be applied to select a most appropriate model type for example in case multiple model types are available for a certain protocol field value type. For example, for a protocol field value of numeric type, use may be made of a model type that contains a range of such protocol field values, a model type that contains a set of protocol field values, etc. Taking into account semantic, preferably taking into account both protocol field value type as well as semantic, may allow to assign an appropriate model type most suitable for that particular protocol field.

An example of the use of semantic may be to determine how "strict" a numeric range is based on the importance of the field. In other words, if the semantic of the protocol field suggests that this field is important for security reasons, a stricter numeric range may be applied than in the opposite case, in which a more loose range (e.g. twice the maximum value and half the minimum value observed during the learning phase) would be applied.

By assigning to a protocol field a model type in accordance with the protocol field value type and/or the protocol semantic, a model type may be assigned that takes account of the contents of the data in the protocol field, thus enabling to tailor the model in accordance with the contents of the protocol field. For example, if the field type is numeric integer and the semantic is that this field contains the length of another field, a model of type numeric distribution may be selected. On the other end, if the field type is numeric integer and the semantic of the field is message type, then a model of type numeric set may be selected. As a third example, if the field type is numeric integer and the semantic of the field is the speed of a motor, then a model of strict numeric range type may be applied.

In an embodiment, the set of models comprises a model for an operator protocol field and a model for an argument protocol field, the associating and assessing being performed for the operator protocol field and the argument protocol field. A protocol may comprise protocol fields containing operators (such as instructions, calls, etc.) and protocol fields containing operands (i.e. arguments) to which the operators apply. It is noted that, according to an embodiment of the invention, a respective model may be associated with protocol fields comprising operators as well as with protocol fields comprising arguments. Thereby, on the one hand, not only intrusive values of arguments may be recognized, but also possibly intrusive operators. Also, taking into account the operator allows to assign a most appropriate model type, thus allowing one to improve intrusion detection accuracy, as an operator will normally be followed by one or more arguments containing certain predetermined type of data.

Furthermore, a protocol message may be intended as the specification of an operation to be performed on the receiving host(s) as required by the sending host. Accordingly, a protocol message may comprise operator fields (i.e. the specification of what operation is required), argument fields (i.e. the specification of how the operation should be performed) and marshalling fields (i.e. fields that are not directly related to the required operation, but contain a parameter needed by the hosts to correctly receive and interpret the message or more in general to handle the network communication). Marshalling may be understood as the process of transforming a memory representation of an object to a data format suitable for storage or transmission, and it is typically used when data must be moved between different parts of a computer program or from one program to another.

For example, an HTTP request contains a method field (e.g. GET, POST, PUT, etc.) specifying the operator, the URL field that contains arguments for the method (e.g./ index.php?id=3) and a number of header fields (e.g. Content-length: 100) that contain information which are not related to the operation itself, but are used by the hosts to communicate (e.g. the header Content-length: 100 specifies that the request message body is 100 bytes long).

As another example, a Modbus/TCP request message contains a function code field identifying what operation is to be performed on the receiving PLC/RTU device, a variable number of data registers specifying the arguments of the desired operation and a number of other fields which are not directly related to the operation (e.g. the register count field, the data length field, etc.) which are needed by the receiving host to understand how to parse the message (e.g. how many registers are being sent).

Attacks or intrusion attempts may be carried out by injecting malicious data in each of these different fields. Similarly, such attacks or intrusion attempts may be detected because values of the different fields are different than normal. Inspecting operator and marshalling fields may increase the accuracy in detecting attacks or intrusion attempts. Accordingly, in an embodiment, the set of models furthermore comprises a model for a marshalling protocol field, the associating and assessing furthermore being performed for the marshalling protocol field.

For example, a buffer overflow attack may be carried out by injecting in a string field more characters than the buffer allocated by the receiving host. Such an attack may be detected because the string field contains unusual character values. On the other hand, a successful attack may be carried out that only uses perfectly valid textual characters as malicious payload. The same attack may then be detected because another field, specifying the string length is larger than normal: this would necessarily be true, as the maximum allowed value for a licit string length would be the size of the buffer allocated by the receiving host.

Additionally, different, specific model types may be used for operator fields, argument fields and marshalling fields in order to further increase the detection accuracy or to lower the number of irrelevant alerts generated. For different operator fields, different models (of same or different model types) may be used. For different argument fields, different models (of same or different model types) may be used. For different marshalling fields, different models (of a same or different model types) may be used. The model types may be selected based on for example data type and semantic as described above.

It is noted that the intrusion detection system and method according to the invention may be applied to any type of data traffic, such as text data traffic (i.e. a text protocol) or binary data traffic (i.e. a binary protocol). In general, the specification of textual protocols does not carry a type description of most of their field values. For example, the specification of the HTTP protocol does not associate a type with header values or parameter values, which must be parsed as textual strings. In such cases, it may be necessary to infer the field type by inspecting the traffic. On the other hand, this behaviour is not present in binary protocols, in which the specifications need to include the type of all protocol fields in order to allow proper parsing. For this reason, applying the present technique to binary protocol may be even more precise than applying it to textual protocol, as for binary protocols the uncertainty of inferring field value types is missing. In particular when account is taken of the data type and semantic of the parsed protocol field, the stream of binary data may be given a meaning, in the sense that the parsing and selecting a suitable model type for each protocol field based on data type and/or semantic, allows to take into account the contents of the binary data. In a binary protocol, the term data type of a protocol field is to be understood as what data is represented by the (binary) data in the protocol field: the binary data for example representing another data type, such as a number, a string, etc.

In general, a protocol message may comprise primitive protocol fields and composite protocol fields. A composite protocol field comprises two or more sub protocol fields, which may each be a primitive protocol field or a composite protocol field. A model for composite protocol fields may comprise of a counter of the instances of the protocol field observed in a learning phase. In case the field was observed less than a given number of times (threshold), observing the composite protocol field during the detection phase may cause the generation of an intrusion detection signal. According to the semantic of a composite protocol field, its importance with regards to security may vary. Therefore, the semantic may be used to specify a different model type or a different sensitivity of the model according to for example the importance of a field with regards to security. For example, in case of a composite field, which is not relevant for security, the threshold of observed instances may be changed to limit the amount of irrelevant intrusion detection signals generated, and thus improve usability. Furthermore, the semantic of a composite field may be propagated to its sub-fields, to allow a more accurate selection of model types and model settings. For example, a basic field of numeric type contained in a composite field which is very relevant to security may be associated to a model of numeric set type, which may define a stricter safe region of values than a model of numeric range type, and thus improve intrusion detection accuracy.

According to another aspect of the invention, there is provided an intrusion detection system for detecting an intrusion in data traffic on a data communication network, the system comprising:
a parser for parsing the data traffic to extract at least one protocol field of a protocol message of the data traffic;
an engine for associating the extracted protocol field with a respective model for that protocol field, the model being selected from a set of models;
a model handler for assessing if a contents of the extracted protocol field is in a safe region as defined by the model; and
an actuator for generating an intrusion detection signal in case it is established that the contents of the extracted protocol field is outside the safe region.

With the system according to the invention, the same or similar effects may be achieved as with the method according to the invention. Also, the same or similar embodiments may be provided as described with reference to the method according to the invention, achieving the same or similar effects. The parser, engine, model handler and actuator may be implemented by means of suitable software instructions to be executed by a data processing device. They may be implemented in a same software program that is to be executed by a same data processing device, or may be executed at two or more different data processing devices. For example, the parser may be executed locally at a location where the data traffic passes, while the engine, model handler and actuator may be located remotely, for example at a safe location. Also, data from different sites may be monitored, whereby for example a parser may be provided at each site, output data from each parser being sent to a single engine, model handler and actuator.

It is noted that the above described method and system may not only be applied for intrusion detection. Instead, or in addition to this purpose, the described method and system may be applied for monitoring purposes. For example, data traffic on a data network of an entity, such as a plant, a data centre, etc., may be monitored. For each or for certain protocol fields a model may be defined that represents a safe or desired operating state. The method and system as described may be applied to detect a status outside such safe operating state. Alternatively, instead of defining a safe or desired operating state on beforehand, the system and/or method as described in this document may be applied in the learning phase, whereby the models obtained in the learning phase enable to obtain a description of the operation as monitored. The data transferred may comprise information from which an operation state may be derived, such data being applied for learning the models for the appropriate protocol fields. For example, in a data network of a plant, control information may be transferred that relates to a speed of motors, a temperature of reactors, a hydraulic pressure, as well as error messages, procedure calls, etc. Such data may be used, either to compare to predefined models that define a desired or safe operating state, or to learn models hence derive a status from the models as learned. The monitoring may comprise checking a "health" state of an industrial plant or computer network by observing the values of certain protocol fields (or combination of protocol fields) which are meaningful for system/network administrators and may define interesting events of the computer network or of an industrial process, etc. Hence, where in this document the term intrusion detection is applied, this may be understood so as to refer to monitoring also.

BRIEF DESCRIPTION OF THE FIGURES

Further effects and features of the invention will be described, by way of example only, with reference to the below description and accompanying schematic drawings in which non limiting embodiments are disclosed, wherein.

DETAILED DESCRIPTION OF THE INVENTION

Figure 1:
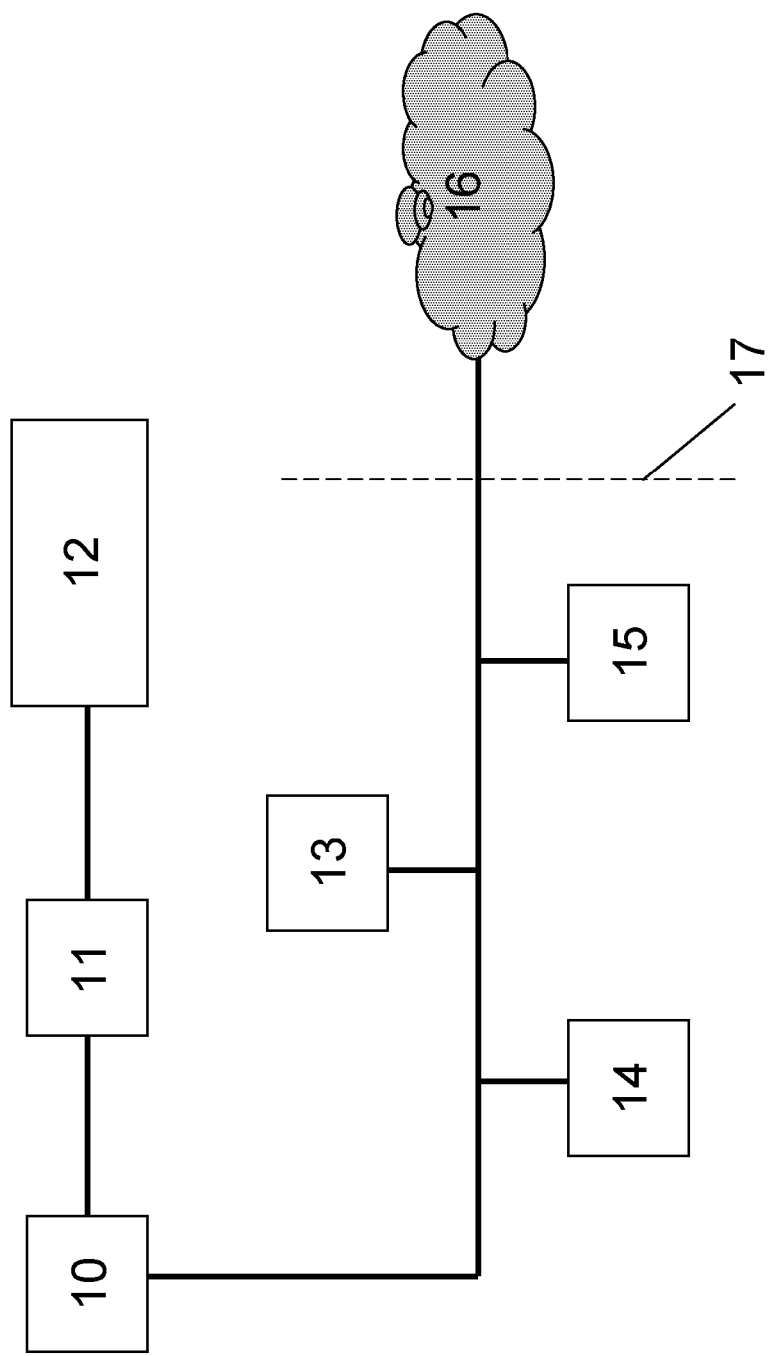
FIG. 1 schematically depicts an example of a data communication network comprising an intrusion detection system according to an embodiment of the invention.

In FIG. 1 a schematic overview is depicted of an example of a data communication network with an intrusion detection system for classifying a protocol message according to an embodiment of the invention. In this network personal computers (or workstations) 14 and 15 are connected with a server 13. The network may be connected to the internet 16 via a firewall 17.

In the data communication network an intrusion or an attack may originate from the Internet 16 or from a personal computer 14, when it has been infected with malicious software.

The data communication network may be a SCADA network or other Industrial Control network. In such a network, machinery 12 may be controlled by software running on a remote terminal unit (RTU) 11, or on a programmable logic controller (PLC). Software running on the server 13 may send protocol messages to the software running on the RTU 11. The software on the RTU 11 may send protocol messages to the machinery, on which also software may be running.

A user may communicate with server 13 via software running on the personal computer 14 or work station 15 by exchanging protocol messages between the software running on the personal computer 14 or work station 15 and the software running on server 13.

The intrusion detection system 10 may be positioned between the RTU 11 and a remainder of the network, as is shown in FIG. 1, or between the RTU 11 and the machinery 12 (not shown). The intrusion detection system 10 may retrieve protocol messages from the data communication network, that may be exchanged between the software running on the personal computer 14 or work station 15 and the software running on server 13, between the software running on server 13 and the software running on RTU 11 or between the software running on RTU 11 and software running on a data processing device of the machinery 12.

A communication protocol may be defined as a formal description of digital protocol message formats and the rules for exchanging those messages in or between (software running on) computing systems. The communication protocol may include descriptions for syntax, semantic, and synchronization of communication. Protocol messages on an application layer in a data communication network may contain one or more fields, which can be characterized by their data types. For instance, a field can represent the entire length of a message, with a number value or a string value.

With more information about the protocol messages, a model describing normal, legitimate or non-intrusive protocol message may include more information about the normal or legitimate values of each protocol field of each protocol message that is exchanged in the data communication network. The model may then be used (e.g. real time) to classify protocol messages from live data traffic in data communication network in order to find anomalies, i.e. something that deviates from the normal behaviour of the data communication network as it is described by the model.

Figure 2:
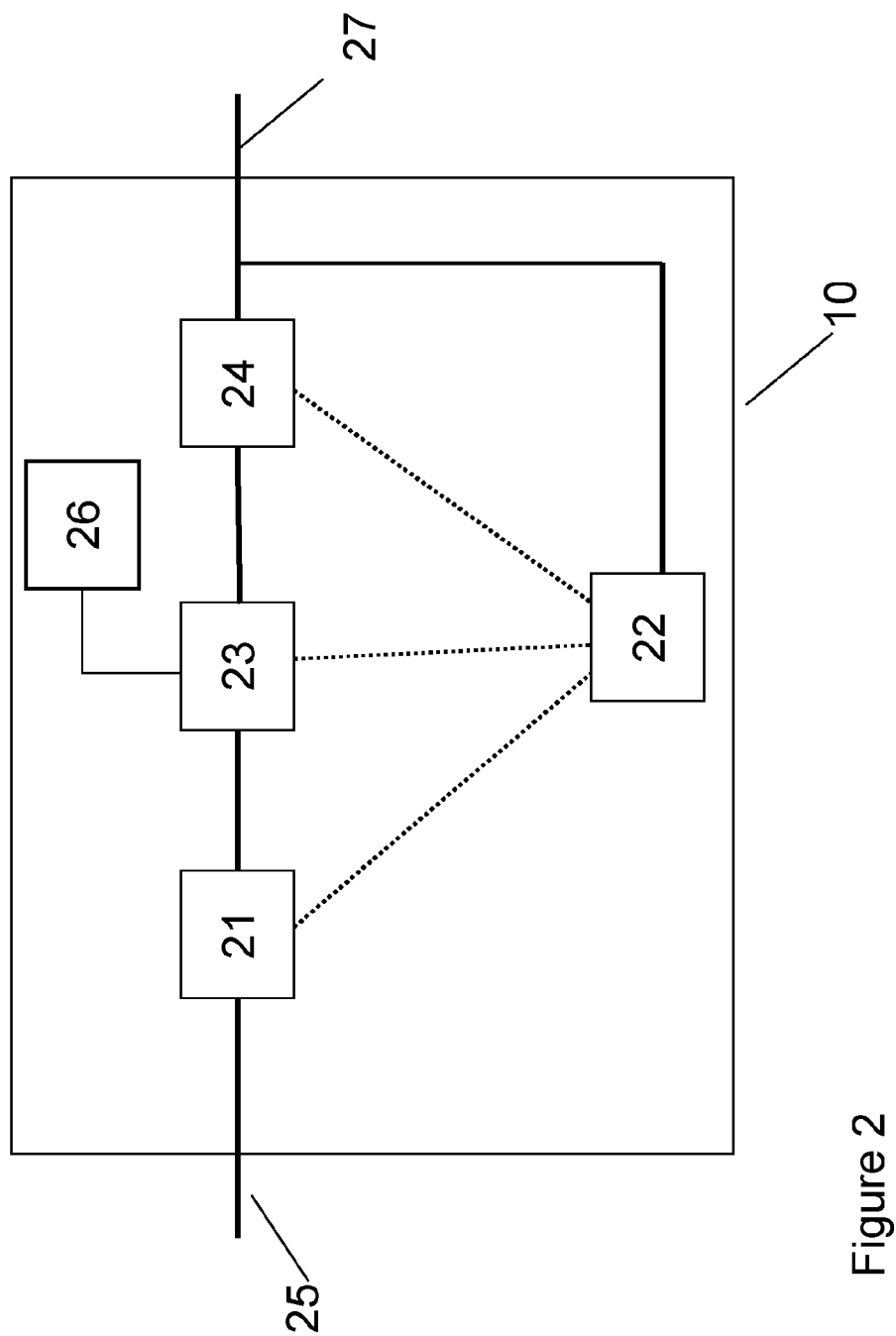
FIG. 2 schematically depicts an overview of an intrusion detection system according to an embodiment of the invention.

FIG. 2 shows a schematic overview of an embodiment of an intrusion detection system 10 according to an embodiment of the invention. The intrusion detection system 10 comprises a network protocol parser 21, arranged for retrieving at least one protocol field in a protocol message in (for example) an application layer of the data communication network. In the learning phase, the protocol messages may be obtained from the network via input 25. The network protocol parser 21 may be used during an optional learning phase as well as during regular operation of the intrusion detection system. Information about the extracted protocol message may be transferred to engine 23.

The intrusion detection system further comprises engine 23, a set of models 26 and a model handler 24. The engine 23 is arranged to associate the extracted protocol field with a model of a certain model type as selected based on a data type and/or semantic of the protocol field. Thereto, the engine comprises or has access to a set of models 26. The engine associates the extracted protocol field with a model that is specific for that protocol field, for example specific for the field data type and/or semantic. Thereto, the set of models 26 comprises different models, each model for a specific one (or more) of the protocol fields. In a learning phase, the engine may, in case no model is available yet for the extracted protocol field, create a model for the extracted protocol field and add it to the set of models. Information about the extracted protocol field may be transferred to handler 24.

The handler 24 then makes an assessment whether or not the extracted protocol field conforms to the model, so as to asses if the contents of the extracted protocol field may be considered an intrusion or not. In the learning phase, the model may be updated using the contents of the extracted protocol field. The handler may output the messages via output 27.

The intrusion detection system may further comprise an actuator 22 to generate an intrusion detection signal in case the (value of the) protocol field has been identified as an intrusion, i.e. outside the safe region defined by the associated model. In response to generating the intrusion detection signal, an intrusion detection action may be performed e.g. comprising raising an alert, filtering the data packet or protocol field (thereby e.g. removing the data packet or protocol field). The intrusion detection signal may also be generated in case the parser could not identify the protocol field (which would imply that the data packet is incompliant with the protocol), and/or in case the model handler during intrusion detection operation could not associate the extracted protocol field with a model from the set (which would imply that the data packet does not comprise the protocol fields that are normally transmitted).

For each protocol field, a specific model is used, preferably using a different model for each different protocol field, so that for a most optimal assessment may be performed for each protocol field, as a model that is specifically dedicated to that protocol field, may be used for assessment of that protocol field.

In an embodiment, the models have been built using at least two model types, wherein a first model type of the at least two model types is optimized for (or only works for) a protocol field with a first data type and wherein a second model type of the at least two model types is optimized for a protocol field with a second data type. It may be the case that the first model type is optimized for a protocol field with one of an number data type, a string data type or a binary data type and the second model type is optimized for a protocol field with another of a number data type, a string data type or a binary data type.

For example, for the value of a protocol field A1 with a number data type, model M-I-A1 may be built that is intended for describing number values. For the value of a protocol field A2 with a number data type, model M-I-A2 may be built that is likewise intended for describing number values. For the value of a protocol field A3 with a string data type, model M-S-A3 may be built that is optimized for or tailored for describing string values. The models for different protocol fields that have the same data type, for example models M-I-A1 and M-I-A2, may be built using the same model architecture, but having a different contents (e.g. a different allowable range, different set of allowable values, etc.) so as to express the differences between the protocol fields A1 and A2.

It may be understood that a model with a model type for describing number values and a model with a model type describing string values may be better or more accurate in describing the values of a protocol message comprising both number values and string values in its protocol fields, than a single model that would be optimized for describing all values, both number values and string values, of a protocol message.

Figure 3:
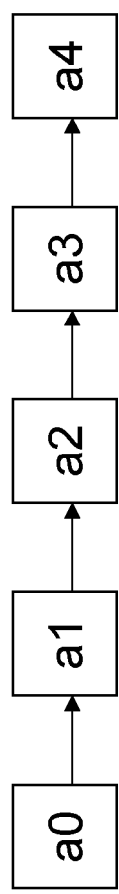
FIG. 3 schematically depicts an overview of a learning phase of a method according to an embodiment of the invention.
Figure 4:
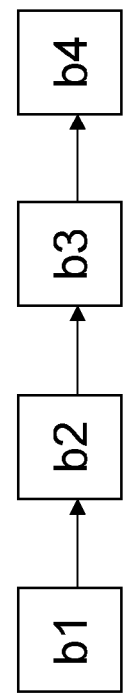
FIG. 4 schematically depicts an overview of an intrusion detection phase of a method according to an embodiment of the invention.

The intrusion detection system 10 may be arranged for building a model during a learning phase. The working of the intrusion detection system 10 and method according to embodiments of the invention will further be described with reference to FIGS. 3 and 4. FIG. 3 schematically illustrates the learning phase and FIG. 4 schematically illustrates the intrusion detection phase.

In FIG. 3, steps of the learning phase have been schematically depicted: Step a1: parsing the data traffic to extract at least one protocol field of a protocol applied in the data traffic. Step a2: associating the extracted protocol field with the model for that protocol field, the model being selected from the set of models, Step a3: in case no association can be made with the existing models of the set of models, creating a new model for the extracted protocol field and adding the new model to the set of models. Step a4: updating the model for the extracted protocol field using the contents of the extracted protocol field.

In general, a protocol message may comprise primitive protocol fields and composite protocol fields. A composite protocol field comprises two or more sub protocol fields, which may each be a primitive protocol field or a composite protocol field. A primitive protocol field can not be divided or split into more protocol fields. In this way a protocol message can be said to comprise a tree structure of protocol fields. For example, in a protocol message the composite protocol field "msg_body" comprise of a primitive protocol field "msg_len" and composite protocol field "msg_data". The composite protocol field "msg_data" may comprise primitive protocol fields "msg_typeA" and "msg_typeB". The term protocol field in this document may refer to any primitive protocol field at any level of such a tree structure.

Different model types may be used. For example, a model type of the protocol field may for example be one of: a number model type, a string model type or a binary model type. In case it is found that the extracted protocol field comprises a number value, a number model type may be applied for that protocol field. In case it is found that the extracted protocol field comprises a string value, a string model type may be applied for that protocol field. It may be the case that (for example in textual protocol), when in the learning phase the network protocol parser is unable to establish that the data type of the protocol field is a number data type or a string data type, a binary data type model is applied as a more universal model type.

As explained above, the set of models may comprise a respective model for each protocol field. A model for a protocol field with a number data type may be differently built (i.e. may be of a different kind or having a different model architecture) than a model for a protocol field with a string data type. Since the models may be optimized for each data type, the model may be more accurate in describing normal, legitimate or non-intrusive protocol messages than models that do not take into account the data type of the protocol fields.

Examples of different kind of model types for different kinds of data types are explained below. For the number data type two model types may be applied, a first one for protocol fields representing lengths and a second one for protocol fields representing enumerations.

If the protocol field represents an enumeration (e.g. a set of values), the model may comprise a set S with all values of the protocol field that have been retrieved in the learning phase. After starting with an empty set, during the learning phase each value that is identified for the protocol field may be added to the set. In the intrusion detection phase, a protocol message may be classified as anomalous, when the value of the corresponding determined protocol field is for example not part of set S.

If the protocol field represents a length, the model may be built on a approximation of the distribution of the values of the protocol field during the learning phase. During the learning phase, the mean $\mu$ and the variance $\sigma2$ of the approximation of the distribution may be calculated on the basis of the sample mean and the sample variance of all the values that have been determined as a content of that protocol field. With the mean $\mu$ and the variance $\sigma2$ of the approximation of the distribution, a probability may be calculated for all values. During the intrusion detection phase, when the probability of a determined value of the protocol field is smaller than a given threshold, the protocol message with this value may be classified anomalous.

A model for a Boolean type protocol field may for example monitor a Boolean value averaged over a number of samples and compare the averaged value to a predetermined threshold. An example of such a model is described below:

During the learning phase a probability Pt is computed that a value of the field is true, and a probability Pf (1−Pt) is computed that the value of the field is false.

2—During the intrusion detection a sequence of n samples for the field value is considered and then a binomial probability of observing such a sequence of values, given Pt and Pf is computed. The probability is then compared with a certain threshold t and an alert is raised if p_sample<t. For example, suppose that during the learning phase we observe an equal amount of true and false values. Then Pt~½ and Pf~½. We set a probability threshold for sequences of 5 values to 0.1. Now, consider that during the intrusion detection phase we observe the sequence [false, false, false, false, false]. The binomial probability of p_sample=P (true=0)=0.03125<0.1. In this case we raise an alert. An example of a model type for strings that can handle ASCII and Unicode strings is described below. First, a model type for ASCII strings is described.

The model type for ASCII string comprises two Boolean values and a list. The first Boolean value (letters) is set to true if we have seen letters, the second Boolean value (digits) is set to true if we have seen digits, and the set (symbols) keeps track of all the symbols we have seen. Given a string field s, a function f(s) is defined that tells whether the string contains letters, numbers and which symbols. For example for the string "userName?#!" we have:

$$f(\text{``userName?\#!''}) = \begin{cases} \text{letters:} & \text{true} \\ \text{digits:} & \text{false} \\ \text{symbols} & \{!, \#, ?\} \end{cases}$$

During the learning phase, given a string s the model M is updated as follows:

$$M = \begin{cases} \text{letters:} & M \cdot \text{letters} \vee f(s) \cdot \text{letters} \\ \text{digits:} & M \cdot \text{digits} \vee f(s) \cdot \text{digits} \\ \text{symbols} & M \cdot \text{symbols} \cup f(s) \cdot \text{symbols} \end{cases}$$

The string characters are evaluated one after the other. For each character the engine verifies the type, and in case the character is either a letter or a digit, the engine updates the model accordingly by setting the corresponding flag to "true". In case the current character is a symbol, it is added to the current symbol set. In case the symbol is already present, it is not added twice.

During the intrusion detection phase, given a string s, an alert may be raised if:
(f(s).letters ∧ ¬ M.letters)∨
(f(s).digits ∧ ¬ M.digits)∨
(f(s).symbols ⊈ M.symbols)

The string characters are again evaluated one after the other. The verification process is straightforward. If the current character is either a letter (or a digit), the engine verifies that letter characters (or digits) have been observed before for the given field. When this verification fails, an alert is raised. In case the character is a symbol, the engine verifies that the given symbol has been observed before. When this verification fails, an alert is raised.

At a beginning, the model M is defined as follows:

$$M = \begin{cases} \text{letters:} & \text{false} \\ \text{digits:} & \text{false} \\ \text{symbols} & \emptyset \end{cases}$$

Another example of a model type for stings, as may be used for Unicode strings, is described below, For Unicode strings, the modelling and detection technique may be similar to the modelling for ASCII strings. The Unicode characters that are not ASCII are treated as ASCII letters, i.e. if a string contains a Unicode character, the boolean value "letters" is set to true. In addition the set of the Unicode scripts (e.g. Latin, Cyrillic, Arabic) as seen during the learning phase, is memorized. With this additional information it is detected, for example, if strange Unicode characters (that probably belongs to a different script than the one seen in the learning phase) are present in a string.

In some more detail, given a Unicode string field s, we define a function f' (s) that tells whether the string contains letters, numbers, which symbols and which Unicode scripts. For example, for the string "mu3sòafà?#!" we have:

$$f'(\text{``}mu3sòfá?\#!\text{''}) = \begin{cases} \text{letters:} & \text{true} \\ \text{digits:} & \text{false} \\ \text{symbols} & \{!, \#, ?\} \\ \text{scripts:} & \{\text{latin}\} \end{cases}$$

For Unicode strings the model M is initialised and updated by performing the same or similar operations as for ASCII strings and by handling the additional field "scripts", similarly to the field "symbols".

Some further example of a model type for binary protocol fields is provided below:

For the binary data type a model may be applied from known anomaly-based intrusion detection systems based on an analysis of the payload.

An example of binary model is based on 1-gram analysis. An n-gram in a sequence of n consecutive bytes.

Given a binary field b of length 1 bytes, we first compute a vector f containing the relative frequency of each byte. In other words, given a byte value v, the element of f corresponding to v is given by:

$$\bar{f}[v] = \frac{\sum_{i=1}^{l} 1, \text{ if } b[i] = v}{l}$$

During the learning phase, a vector of relative frequencies is applied to compute a mean and standard deviation for each byte value. Therefore, given a sequence of n binary fields b1 . . . bn, and their associated vectors of relative byte frequency (f1 . . . fn), two vectors μ and σ are computed that contain respectively the mean and standard deviation of each byte value (from 0 to 255). These two vectors in this example form the binary model.

During the testing phase, given a binary field value s, an associated vector of relative frequencies fs is computed first. Then, an appropriate function F (e.g. a normalised Euclidean distance) is applied to determine a distance between fs and the model as built during learning phase. If the resulting distance exceeds a predetermined threshold, an alert may be raised.

A more accurate version of the model described above may be obtained by splitting the set of learning values b1 . . . bn into subsets. To split the learning set into subsets a clustering algorithm may be applied, such as a Self Organizing Map (SOM), on the input values (b1 . . . bn). A separate model (i.e. the array pair μ, σ) may then be built for each subset.

During the intrusion detection phase, a cluster algorithm is run on the binary field value (s). The test as described above may then be applied on the model associated to the resulting cluster.

A third example of a binary model is a so-called network emulator. A network emulator is an algorithm that is able to determine if dangerous executable instructions are contained inside a set of bytes. Given a sequence of bytes, the algorithm first translates existing byte values into the relative assembly instructions (disassembly).

Afterwards, it tries to find sequences of instructions that can be recognised as dangerous or suspicious (for example long sequences of NOP instructions, which are typically found inside malicious shell codes of known attacks). In case such sequences are found, an alert is raised. Note that this type of binary model does not require a training phase.

In case a binary field contains a so-called Binary Large OBject (BLOB) in which data is organized according to a structure that is not specified in the network protocol specification, the same approach described in this document may be applied to further divide the BLOB into its constituting fields, until basic fields are extracted and processed (e.g. numeric fields, string fields, Boolean fields, etc.). For example, a binary protocol field may contain a GIF or JPEG image, for which there exist a specification, but such specification is not part of the network protocol specification itself. In this case, the specification of GIF or JPEG images could be used to further divide the field value into its basic constituent fields. A model may then be selected and built accordingly for the constituent fields of the object. Another such case happens when the binary field contains an entire memory region of one of the hosts communicating (e.g. the memory maps of PLCs exchanged as part of the Modbus protocol). The structure of this memory region may be defined in other documents (e.g. in the PLC vendor specifications), or may be inferred by observing enough samples of data. Such information may be used to further divide the memory region into its basic fields which could then be processed according to the techniques illustrated in this document.

Furthermore, for the string data type a model may be applied as is described in "Bolzoni, D. and Etalle, S. (2008), Boosting Web Intrusion Detection Systems by Inferring Positive Signatures. In: Confederated International Conferences On the Move to Meaningful Internet Systems (OTM)". For the binary data type a sub-model may be applied from known anomaly-based intrusion detection systems based on the analysis of the payload. An example may be found in "Anomalous payload-based network intrusion detection" (RAID, pages 203-222, 2004) by Ke Wang and Salvatore J. Stolfo. In this work the authors present a system, named PAYL, which leverages n-gram analysis to detect anomalies. An n-gram in a sequence of n consecutives bytes. The relative frequency and standard deviation of 1-grams (sequences of 1 byte) are analyzed and stored into detection models built during the learning phase. Then, in the intrusion detection phase, an appropriate model is selected (using the payload length value) and used to compare the incoming traffic.

Another example may be found in "POSEIDON: a 2-tier Anomaly-based Network" (IWIA, pages 144-156. IEEE Computer Society, 2006) by Damiano Bolzoni, Emmanuele Zambon, Sandro Etalle, and Pieter Hartel. In this paper the authors build on the top of PAYL an improved system by discarding the payload length to select (and build) the detection models, but use instead a neural network that pre-process the payload data and whose output is used to select the appropriate detection mode.

A still further example may be found in Michalis Polychronakis, Kostas G. Anagnostakis, and Evangelos P. Markatos. Comprehensive Shellcode Detection using Runtime Heuristics. In Proceedings of the 26th Annual Computer Security Applications Conference (ACSAC). December 2010, Austin, Tex., USA. In this paper the authors present a "network emulator". This software component implements heuristics and simulates via software a physical CPU. The network emulator can test whether the input data contains executable (and harmful) code. In an embodiment, the parsing process may comprises the steps of:
 i) collecting data packets from the data communication network;
 ii) defragmenting IP packets;
 iii) reassembling TCP segments;
 iv) retrieving application data; and
 v) retrieving protocol messages.

As stated before, it is possible to select different model types according to the semantic of the field the model is associated to. It is also possible to adjust one or more model parameters (specific to each model type) according to the semantic to broaden or narrow the safe region defined by the model. Here some examples are given of using the field semantic to select the model type or to adjust the model parameters.

In case of a numeric field that represents the protocol message type, a model of numeric enumeration type may be used. Such a model type allows making sure that only the message types enumerated in the model are defined as the safe region. In case the model is built automatically during a learning phase, all the message types observed are considered as safe. In case the model is build manually, the set of allowed messages may be built according to specific security policies. For example, a security policy may impose that only read operations are performed on a certain host. In this case the set of allowed messages would contain only read messages.

In case of a numeric field that represents the speed of an engine, in the context of industrial process, a numeric range model may be used. Such a model type allows making sure that the engine speed will not be set to a lower or upper value that what is considered safe. In case the model is built automatically during a learning phase, the minimum/maximum allowed values may be set to the minimum/maximum speeds observed during the learning phase (exact range). In case the model is build manually, the range minimum and maximum values may be set based on the technical specifications of the engine, to make sure that speed remains into tolerable operational conditions.

In case of a numeric field that represents the length of a security-related field (e.g. the length of a string buffer), a model of numeric distribution type may be used. Moreover, since the field is very relevant to security, as it may be the target of a buffer overflow attack, a high probability threshold may be set. In this way, the safe area defined by the model is restricted to values that have a high probability of being generated by the same numeric distribution observed during a learning phase. In other words, if the length field value is too big with regards to what was previously observed during the learning phase, the value is considered as anomalous, and therefore a possible attack. For example, the shellcode used to carry out a buffer overflow attack may be larger than the normal content of the buffer, thus generating an anomalous value for the buffer length field.

In case of a string field that represents a person's name, a model of string type may be selected and the default threshold for the number of symbol characters not included in the model may be set to a very low level. Since a person's name is not expected to contain many symbols, setting the default threshold to a very low level ensures that an intrusion detection signal is generated immediately in case the observed value contains symbols that are present in the model. This may be the case of a so-called SQL injection attack that leverages special characters such as single or double quotes, commas, etc.

FIG. 4 schematically depicts the steps of the intrusion detection process: step b1: parsing the data traffic to extract at least one protocol field of a protocol message of the data traffic, step b2: associating the extracted protocol field with a model for that protocol field, the model being selected from a set of models, step b3: assessing if a contents of the extracted protocol field is in a safe region as defined by the model, and step b4:generating an intrusion detection signal (e.g. followed by filtering the extracted protocol field or protocol message comprising the protocol field, generating an alarm to a user, or any other intrusion detection action) in case it is established that the contents of the extracted protocol field is outside the safe region.

In an embodiment, the intrusion detection signal may further be generated when the parsing cannot establish the field as complying to the protocol or when the extracted field cannot be associated with any of the models of the set of models.

Figure 5:
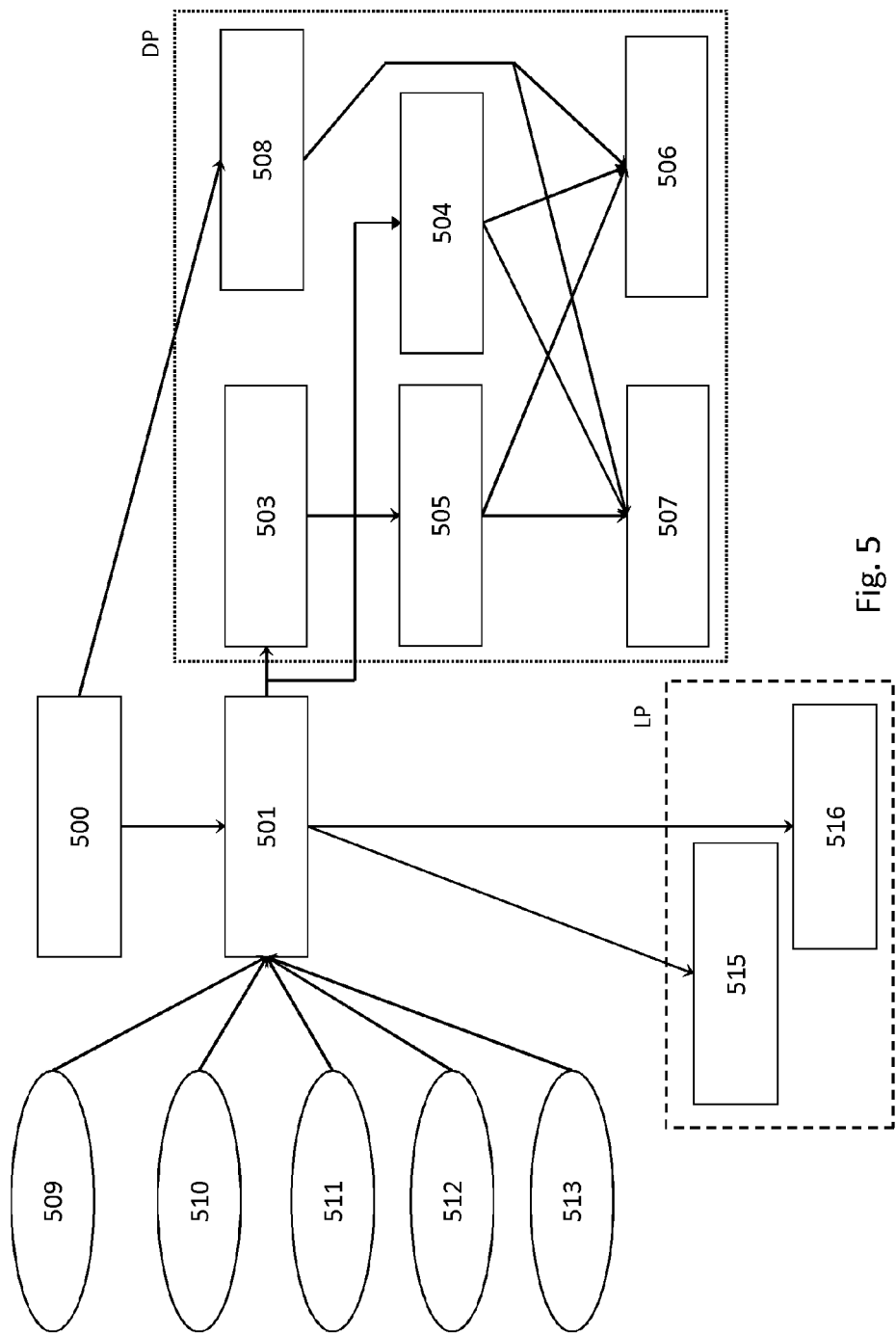
FIG. 5 schematically depicts a block diagram to illustrate an intrusion detection system and method according to an embodiment of the invention.

FIG. 5 schematically depicts, as an example, an overview of concepts proposed in this patent application. The process starts with parsing the network traffic (500) to extract at least one protocol field of a protocol message. The second step comprises associating the extracted protocol field with a model for that protocol field (501), the model being selected from a set of models. The set of models may comprise different model types, the set of models is represented in FIG. 5 by 513. The selection of the model type for an extracted protocol field may be driven by both the protocol field value type (represented by 511) and the semantic associated to the protocol field (represented by 512). The set of different model types (513) is also provided as input, the different model types may include a numeric range model, a numeric set (enumeration) model, a numeric distribution model, an ASCII string model, an Unicode string model, a Boolean model, an n-gram-based binary model, a network emulator, a set of intrusion detection signatures, etc. The process of associating a parsed protocol field with its corresponding model (of a certain model type) may also be improved by taking into account the dependency of a field that describes an operation with a field that describes an argument of such operation (as represented by 509). More in general, any dependency of one field value on another field value (as represented by 510) may be taken into account when associating a parsed protocol field with its corresponding model, in such a way that multiple models are built for the same field according to the value of another field in the same message. In a learning phase, in case a model of the selected model type does not exist for a parsed protocol field, such model may be created (step 515). Similarly, in case a model already exists, the model may be updated in a learning phase to include the current parsed field value in the safe region defined by the model (step 516). In case the parsing cannot establish a field observed in the network data as complying with the protocol specification, an intrusion detection signal may be generated (step 508). During the detection phase, in case it is not possible to associate to the parsed field an existing model of the selected model type, an intrusion detection signal may be generated (step 504). On the other hand, in case it is possible to associate to the parsed field an existing model of the selected model type, the field value is assessed with regards to the safe region defined by the model (step 503). In case the parsed protocol field value is not within the safe region defined by the model, an intrusion detection signal may be generated (step 505). Finally, in case an intrusion detection signal is generated because of any of the reasons described above, further steps may be taken, such as removing from the network traffic the protocol message associated with the protocol field with anomalous value (step 506), or raising and outputting an intrusion alert message (step 507).

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention. Elements of the above mentioned embodiments may be combined to form other embodiments.

The terms "a" or "an", as used herein, are defined as one or more than one. The term another, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention claimed is:

1. An intrusion detection method for detecting an intrusion in data traffic on a data communication network, the method comprising:
   parsing the data traffic to extract at least one protocol field of a protocol message of the data traffic;
   associating the extracted protocol field with a respective model for that protocol field, the model being selected from a set of models, the set of models comprising different models for different protocol fields;
   assessing if a contents of the extracted protocol field is in a safe region as defined by the model; and
   generating an intrusion detection signal in case it is established that the contents of the extracted protocol field is outside the safe region,
   wherein in a learning phase a model is built for the extracted protocol field, the learning phase comprising:
   providing a plurality of model types,
   determining a data type of the extracted protocol field,
   selecting a model type for the extracted protocol field from the plurality of model types on the basis of a characteristic of the extracted protocol field, the characteristic comprising the determined data type, and
   building the model for the extracted protocol field on the basis of the selected model type.

2. The intrusion detection method according to claim 1, wherein the set of models comprises a model for an operator protocol field and a model for an argument protocol field, the associating and assessing being performed for the operator protocol field and the argument protocol field.

3. The intrusion detection method according to claim 2, wherein the set of models furthermore comprises a model for a marshalling protocol field, the associating and assessing furthermore being performed for the marshalling protocol field.

4. The intrusion detection method according to claim 1, wherein the protocol message comprises at least one primitive protocol field and at least one composite protocol field such that the protocol message comprises a tree structure of protocol fields.

5. The intrusion detection method according to claim 1, wherein the characteristic of the protocol field comprises a semantic of the protocol field, the method comprising:
   determining a semantic of the extracted protocol field, and selecting the model type using the determined semantic.

6. The intrusion detection method according to claim 1, wherein the set of models comprises a respective model for each protocol field of the set of protocol fields.

7. The intrusion detection method according to claim 1, wherein the model for the field is determined in a learning phase, the learning phase comprising:
   parsing the data traffic to extract at least one protocol field of the protocol applied in the data traffic;
   associating the extracted protocol field with the model for that protocol field, the model being selected from the set of models; and
   updating the model for the extracted protocol field using a contents of the extracted protocol field.

8. The intrusion detection method according to claim 7, wherein if no association can be made between the extracted protocol field and one of the models,
   creating a new model for the extracted protocol field and adding the new model to the set of models.

9. The intrusion detection method according to claim 1, wherein the intrusion detection signal is further generated when the parsing cannot establish the field as complying with the protocol.

10. The intrusion detection method according to claim 1, wherein the intrusion detection signal is further generated when the extracted field cannot be associated with any of the models of the set of models.

11. The intrusion detection method according to claim 1, wherein the protocol is at least one of an application layer protocol, a session layer protocol, a transport layer protocol or a lower level protocol stack protocol.

12. The intrusion detection method according to claim 1, wherein the method further comprises, in response to generating the intrusion detection signal, at least one of:
   removing the protocol field or a data packet containing the protocol field; and
   raising and outputting an intrusion alert message.

13. The intrusion detection method according to claim 1, wherein the model for the protocol field comprises at least one of:
   a set of acceptable protocol field values,
   a numeric distribution of protocol field values; and
   a definition of a range of acceptable protocol field values.

14. The intrusion detection method according to claim 1, wherein the model for the protocol field comprises:
   a definition of acceptable letters, digits, symbols, and scripts.

15. The intrusion detection method according to claim 1, wherein the model for the protocol field comprises a set of predefined intrusion signatures.

16. The intrusion detection method according to claim 1, wherein the set of models comprises two models for one protocol field, a specific one of the two models being associated with the one protocol field based on the value of another protocol field.

17. An intrusion detection system for detecting an intrusion in data traffic on a data communication network, the system comprising:
   a parser for parsing the data traffic to extract at least one protocol field of a protocol message of the data traffic;
   an engine for associating the extracted protocol field with a respective model for that protocol field, the model being selected from a set of models, the set of models comprising different models for different protocol fields;
   a model handler for assessing if a contents of the extracted protocol field is in a safe region as defined by the model; and
   an actuator for generating an intrusion detection signal in case it is established that the contents of the extracted protocol field is outside the safe region,
   wherein the system is arranged for, in a learning phase, build a model for the extracted protocol field, the learning phase comprising:
   providing a plurality of model types,
   determining a data type of the extracted protocol field,
   selecting a model type for the extracted protocol field from the plurality of model types on the basis of a characteristic of the extracted protocol field, the characteristic comprising the determined data type, and
   building the model for the extracted protocol field on the basis of the selected model type.

18. The intrusion detection system according to claim 17, wherein the set of models comprises a model for an operator protocol field and a model for an argument protocol field, the engine being arranged for performing the associating and assessing for the operator protocol field and the argument protocol field.

19. The intrusion detection system according to claim 18, wherein the set of models furthermore comprises a model for a marshalling protocol field, the engine furthermore being arranged for performing the associating and assessing for the marshalling protocol field.

20. The intrusion detection system according to claim 17, wherein the protocol message comprises at least one primitive protocol field and at least one composite protocol field such that the protocol message comprises a tree structure of protocol fields.

21. The intrusion detection system according to claim 17, wherein the characteristic of the protocol field comprises a semantic of the protocol field, the system being arranged for:
   determining a semantic of the extracted protocol field, and selecting the model type using the determined semantic.

22. The intrusion detection system according to claim 17, wherein the set of models comprises a respective model for each protocol field of a set of protocol fields.

23. The intrusion detection system according to claim 17, further arranged to be operated in a learning phase, the learning phase for learning at least one of the models, the model handler being arranged for updating in the learning phase the model for the extracted protocol field using a contents of the extracted protocol field.

24. The intrusion detection system according to claim 23, wherein the engine is further arranged to in the learning phase, if no association can be made between the extracted protocol field and one of the models, creating a new model for the extracted protocol field and adding the new model to the set of models.

25. The intrusion detection system according to claim 17, wherein the actuator is further arranged to generate the intrusion detection signal in response to an indication from the parser that the parser cannot establish the field as complying to the protocol.

26. The intrusion detection system according to claim 17, wherein the actuator is further arranged to generate the intrusion detection signal in response to an indication from the engine that the extracted field cannot be associated with any of the models of the set of models.

27. The intrusion detection system according to claim 17, wherein the protocol is at least one of an application layer protocol, a session layer protocol, a transport layer protocol or a lower level protocol stack protocol.

28. The intrusion detection system according to claim 17, wherein the actuator is arranged to, in response to the generation of the intrusion detection signal:
   removing the protocol field or a data packet containing the protocol field; and
   raising and outputting an intrusion alert message.

29. The intrusion detection system according to claim 17, wherein the model for the protocol field comprises at least one of
   a set of acceptable protocol field values,
   a numeric distribution of protocol field values; and
   a definition of a range of acceptable protocol field values.

30. The intrusion detection system according to claim 17, wherein the model for the protocol field comprises:
   a definition of acceptable letters, digits, symbols, and scripts.

31. The intrusion detection system according to claim 17, wherein the model for the protocol field comprises a set of predefined intrusion signatures.

32. The intrusion detection system according to claim 17, wherein the set of models comprises two models for one protocol field, the engine being arranged for associating a specific one of the two models with the one protocol field based on the value of another protocol field.

* * * * *